Figure 1:
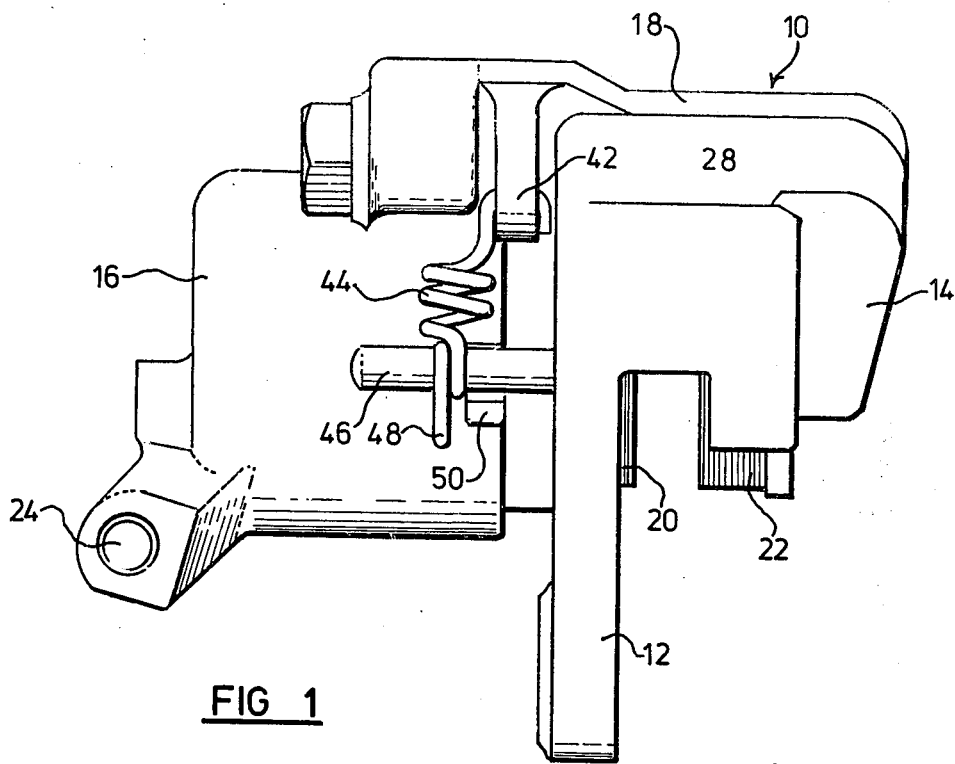

United States Patent [19]

Rath

[11] 4,034,858
[45] July 12, 1977

[54] SUPPORT STRUCTURE FOR A DISC BRAKE CALIPER

[75] Inventor: Heinrich Bernhard Rath, Vallendar (Rhine), Germany

[73] Assignee: Girling Limited, Birmingham, England

[21] Appl. No.: 605,854

[22] Filed: Aug. 19, 1975

[30] Foreign Application Priority Data

Aug. 30, 1974 United Kingdom ............ 37965/74

[51] Int. Cl.² ................ F16D 55/224; F16D 65/54
[52] U.S. Cl. ............................. 188/73.3; 188/71.8
[58] Field of Search ............ 188/18 A, 71.1, 72.4, 188/72.5, 73.3, 73.5, 73.6, 71.8, 196 P

[56] References Cited

U.S. PATENT DOCUMENTS

| 3,155,194 | 11/1964 | Gancel | 188/73.3 |
| 3,403,756 | 10/1968 | Thirion | 188/73.3 |
| 3,616,879 | 11/1971 | Pauwels | 188/73.3 |
| 3,682,277 | 8/1972 | Brown | 188/73.3 |
| 3,782,510 | 1/1974 | Roth | 188/73.3 |
| 3,848,709 | 11/1974 | Tourneur | 188/73.3 |
| 3,893,546 | 7/1975 | Kestermeier | 188/73.3 |
| 3,899,052 | 8/1975 | Burnett et al. | 188/73.6 |

Primary Examiner—Trygve M. Blix
Assistant Examiner—Edward R. Kazenske
Attorney, Agent, or Firm—Scrivener, Parker, Scrivener and Clarke

[57] ABSTRACT

A sliding caliper disc brake has a caliper member which applies friction elements to opposite sides of a rotatable disc and which is slidably mounted on a fixed torque-taking member by a single pin disposed at one side of the caliper. The other side of the caliper is urged into sliding engagement with the torque member by a spring arranged between the caliper and a projection on the torque member. The caliper carries a lug which is normally spaced from the projection but is engageable with the projection to limit outward pivoting of the caliper about the pin in the event of failure of the spring. The caliper lug may engage the spring so as to slide the spring on the projection upon sliding of the caliper so as to maintain spring orientation as the friction elements wear.

2 Claims, 5 Drawing Figures

SUPPORT STRUCTURE FOR A DISC BRAKE CALIPER

This invention concerns disc brakes and relates more particularly to spot type disc brakes of the kind in which a friction element is directly moved into engagement with a brake disc, or rotor, the other friction element being displaced as a result of the reaction forces set up by such engagement.

In disc brakes of the kind described the member transmitting the reaction forces often takes the form of a C-shaped caliper or clamping member, the actuating means being a hydraulic piston and cylinder mechanism housed in one of the legs of the caliper, the caliper being slidably supported on a pair of pins extending between the torque member and the caliper.

In one known disc brake one of the pair of pins is an axial guiding and drag transmitting pin for the caliper whilst the other of the pair of pins restrains rotation of the caliper about that one pin. Whilst the restraining pin is located in an aperture in the torque plate and so prevents the caliper rotating into spragging engagement with the wheel, nevertheless the pin and aperture are susceptible to corrosion and dirt affecting sliding movenent of the caliper and causiing the indirectly actuated friction pad to be applied with significantly less force than the directly actuated friction pad upon which the hydraulic piston acts. Even when clean and uncorroded the free caliper sliding movement depends on the accurate pin to aperture sliding clearance whereas often the pin to aperture clearance is too large resulting in unacceptable rattle under vibration conditions or is too small resulting in undue caliper sliding friction.

Another known disc brake comprises a fixed torque member, a caliper member, an axially directed pin extending between the members and slidingly supporting the caliper for movement towards and away from the brake rotor, and resilient bias means circumferentially spaced from the pin and acting to bias the caliper against the torque member; the resilient bias means extending betweenthe caliper and a projection carried by the torque member.

According to the present invention, the caliper member has a lug normally spaced from the projection carried by the torque member and engageable with said projection in the event of pivoting of the caliper member about the pin against the biasing of the resilient means.

The resilient means may be a tension spring which is preferably slidably engaged with one of the members. In one preferred embodiment, the torque member projection is a peg over which the tension spring engages and the caliper lug can engage the spring to move it axially when the caliper is moved upon pad wear, to maintain the spring angle to the caliper constant. The peg can be screwed to the torque member, or can be a split pin fitting in a torque plate aperture or be otherwise removable to permit pad replacement when required by pivoting of the caliper about the pin.

Preferably, the surfaces of the caliper engaging respectively the indirectly actuated pad assembly and the torque member are arranged so as to be capable of being broached in a single machining operation.

In another embodiment the torque member is integral with a stub axle and comprises a pair of arms extending alongside one face of the disc and over the disc periphery. The pads are guided directly on the portions of the arms extending over the disc. The pin is of two parts, one part being sealingly located in a blind bore in the caliper and having at its free end a tapped opening, into which the second part of the pin is screwed, the first and second parts of the pin having shouldered portions between which the torque member is clamped. To replace the pads the caliper is swung about the pin after release of the springholding the caliper member against the face of the torque member circumferentially spaced from the pin, and after removal of the peg to which the spring is connected and which overlies the lug on the caliper member normally engageable with the peg if the spring fractures.

In this embodiment the first part of the pin, if desired, passes with clearance through the opening in the torque member but usually this pin will be a fairly close fit in that opening. The pin is directed away from the disc and can be located on the brake pad drag line. In an alternative embodiment, the pin is mounted on the caliper member, being received in a blind bore in the torque member and located over the disc.

In a further embodiment the pin can be a single part member screwed into the torque member and projecting away from the disc, the caliper being slidably mounted either directly upon the pin or upon an intermediate metal bush arranged to assist retention of the pin in the torque member.

In yet further embodiments, the friction elements each comprise friction material mounted in a rigid metal back plate having upstanding arms engaging opposed parts of the caliper bridge, the drag from both pads therefore being first taken by the caliper and then transmitted to the torque member. Perferably the pads are retained by a pair of retaining plates removably attached to the caliper bridge.

If desired one or both of the engagement surfaces of the caliper and torque member which are resiliently biased together can be coated to minimise vibration noises; alternatively one or both surfaces can carry a noise reducing sleeve or an intermediate member can be located therebetween.

In alternative embodiments, for pad replacement the pin can be removed rather than the peg and resilient means; or both pin and peg can first be removed.

Other types of resilient bias spring can be used; whilst in other embodiments the spring can be replaced by a removable retainer, for instance a swinging arm pivotally mounted on the torque member and normally arranged to overlie the caliper, being held in position by a removable cotter pin or the like.

A general advantage of the above arrangements is that a pin mounted caliper can consistently be produced having the designed sliding friction, despite the tolerance variations always arising under mass production conditions. The brakes on a vehicle axle can be simply assembled, when installed give consistent braking, and furthermore torque member deflection under exceptionally heavy braking or caliper movement due to caliper vibration results in minimum effect on the caliper sliding friction and can indeed be beneficial in assisting cleaning of the sliding surfaces.

An installation advantage arises because the parts of the torque member against which the caliper is resiliently biased are immediately over the disc so that the caliper can be fitted even where other vehicle components are located alongside that side of the hydraulic cylinder. In these cases where the pin extends away from the disc, the pin bearing surface is not only circumferentially but also axially spaced from the torque member caliper engagement surface and so provides a long bearing surface to resist tilting of the caliper, which helps for instance to avoid rattle of the caliper against the outboard pad back plate.

Figure 2:
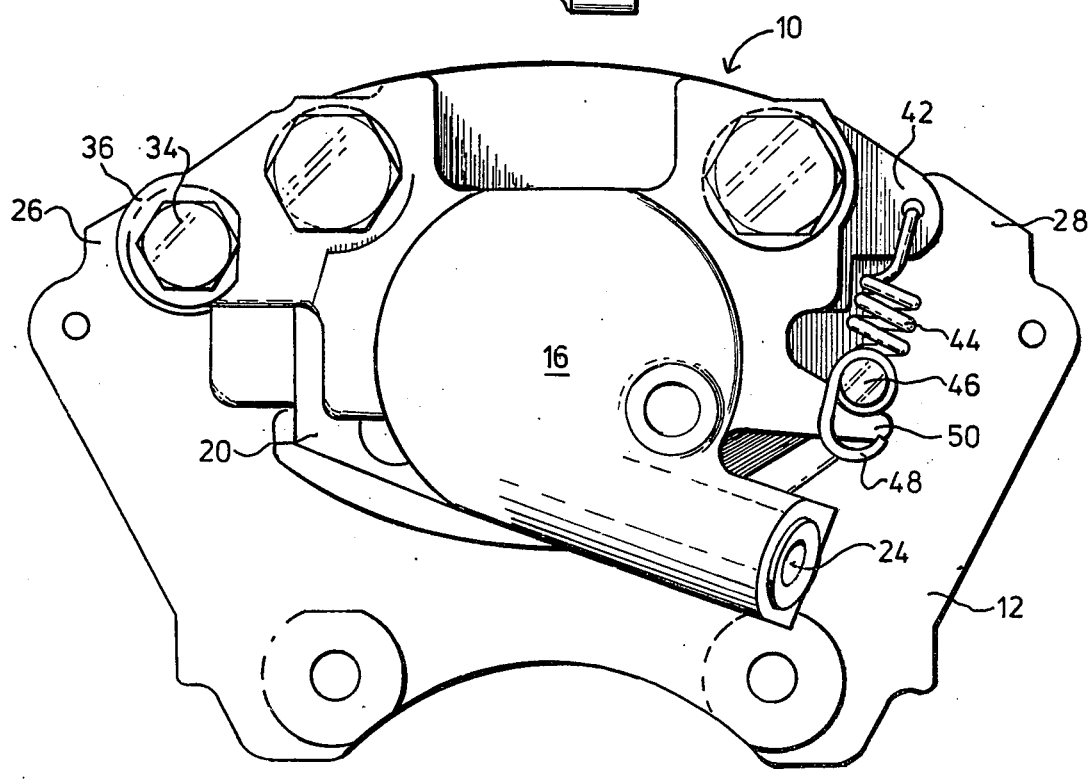
Figure 3:
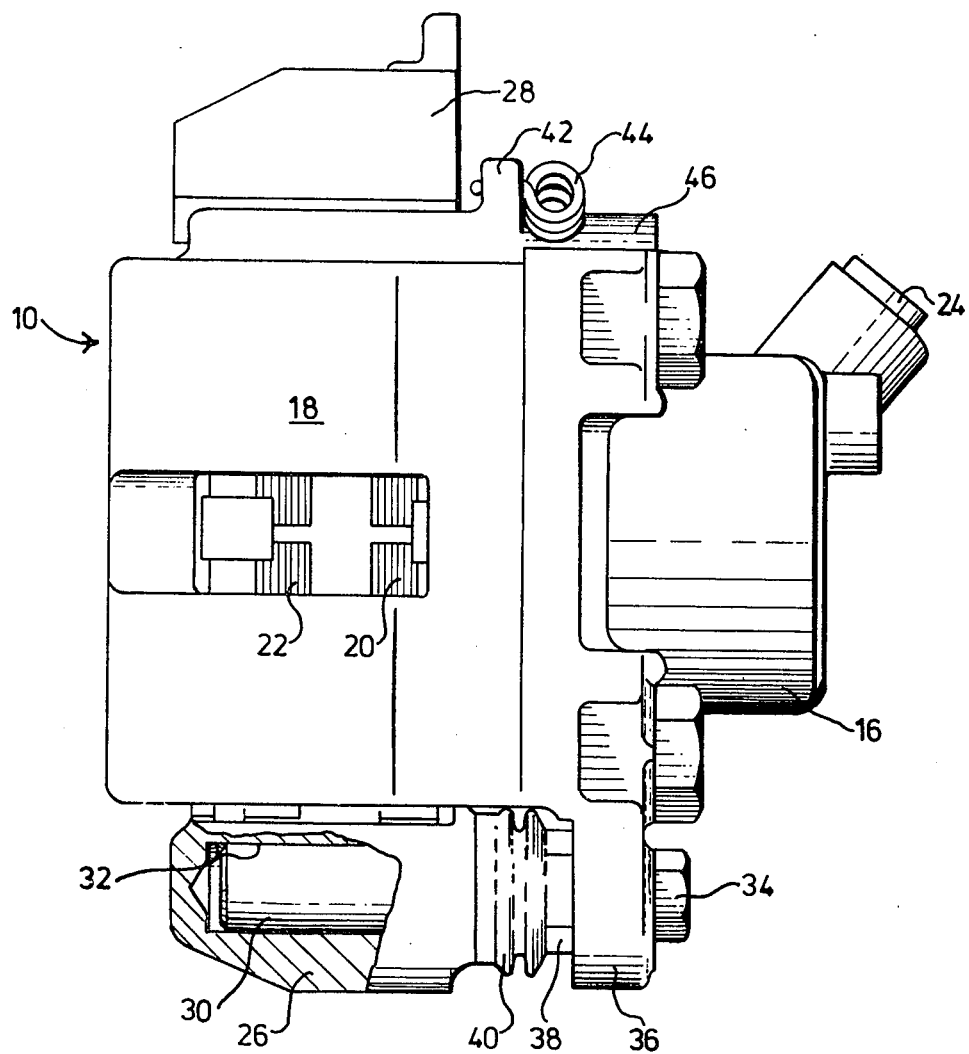
Figure 4:
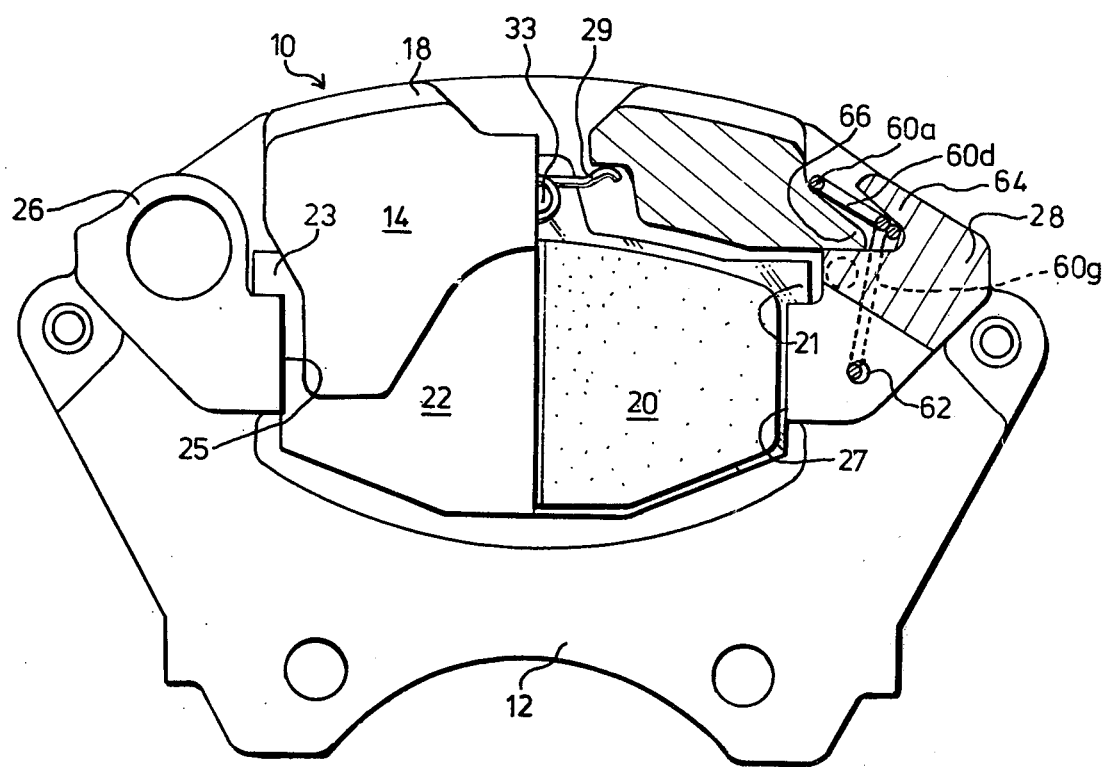
Figure 5:
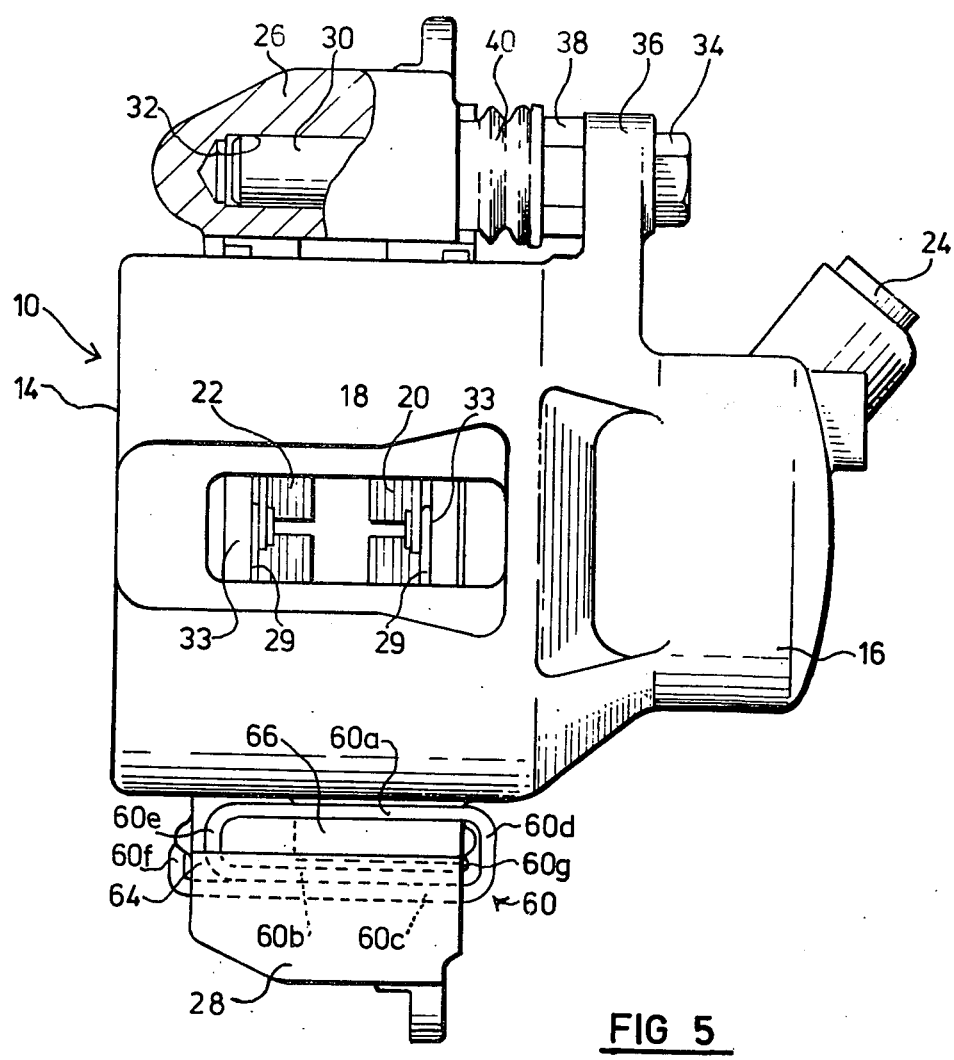

The invention is further described, by way of example, with reference to he accompanying drawings, in which:

FIG. 1 is a side elevation of a disc brake constructed in accordance with the invention, FIG. 2 is a rear view of the brake shown in FIG. 1, FIG. 3 is a plan view, partly in section, of the brake of FIGS. 1 and 2, FIG. 4 is a front view, partly in section, of a modified brake in accordance with the invention, and FIG. 5 is a plan view, partly in section, of the brake shown in FIG. 4.

The disc brake shown in FIGS. 1 to 3 comprises a generally C-shaped caliper member generally designated 10 slidably mounted on a torque member 12 which is adapted to be secured to a fixed part of a vehicle. The caliper member 10 has a front limb 14 and a rear limb 16 interconnected by a centrally apertured bridge portion 18. The rear caliper limb 16 carries a hydraulic actuator comprising a piston (not shown) slidable in a cylinder and engaging the backplate of a directly actuated friction pad 20. An indirectly actuated or outboard friction pad 22 has its backplate engaged by the front caliper limb 14. When hydraulic fluid under pressure is admitted into the actuator by way of a port 24, the directly actuated inboard pad 20 is urged into braking engagement with one side of a rotatable disc (not shown) whereupon the caliper member 10 is caused to slide with respect to the torque member 12 so as to apply the indirectly actuated pad 22 to the other side of the disc.

The torque member 12 has two arms 26 and 28 which extend over the periphery of the disc and carry both the inboard and outboard pads. As in the embodiment of FIG. 4 to be described hereinafter, the lateral edges of the pad backplates slidably engage inwardly facing surfaces of the torque member arms 26 and 28 so that circumferential drag forces experienced by the pads when they are clamped across a rotating disc are transferred directly to the torque member and are not transmitted through the caliper member and through the sliding connection between the two members.

The sliding connection between the caliper and torque members is provided by a pin assembly which comprises a pin element 30 slidably received in a blind opening 32 in the torque member arm 26 and a bolt 34 which passes through an opening in an ear 36 of the caliper and extends into a screw-threaded bore in the pin element 30 to clamp a hexagon head 38 of the pin element 30 against the ear 36. A resilient sealing boot 40 seals the sliding surfaces of the pin element 30 and its opening 32 against the ingress of dirt and moisture and also serves to retain the pin element 30 in its opening 32 when the caliper member is removed from the torque member following withdrawal of the bolt 34. The other side of the caliper member has an ear 42 which is urged into sliding contact with the torque member by a tension spring 44 which has one of its ends looped through a hole in the ear 42 and its other end coiled around a projection in the form of a peg 46 fixed to the torque member. The spring 44 terminates in a curled-over portion 48 which overlies a lug 50 extending from the caliper. The lug 50 is spaced from the peg 46 when the tension spring urges the adjacent side of the caliper into sliding engagement with the torque member but is engageable with the peg 46 to limit outward pivoting of the caliper about the pin 30 in the event of fracture of the spring 44. Engagement between the lug 50 and the curled-over end 48 of the spring during brake actuation causes sliding displacement of the spring along the peg 46 as the friction pads wear and rest position of the caliper shifts progressively to the rear so that the inclination of the spring remains constant.

The embodiment illustrated in FIGS. 4 and 5 is generally similar to that of FIGS. 1 to 3 and corresponding parts have like reference numerals.

As may be seen from FIG. 4, the arms 26 and 28 of the torque member have inwardly directed surfaces 25 and 27 on which the lateral edges of the pad backplates slide. In addition, the backplates of the pad have outwardly directed lugs 21 and 23 which are urged into engagement with the torque member arms by torsion springs 29 each of which has two arms engaging the bridge portion 18 of the caliper and has its central portion wrapped around a peg 33 on the respective pad back-plate.

The side of the caliper member opposite to the pin 30 is urged into sliding engagement with the torque member by a wire spring 60 which has three limbs 60a, 60b, and 60c extending parallel to the axis of disc rotation and joined by end cross pieces 60d and 60e. The spring is connected to the torque member by having its parallel limbs 60b and 60c connected by approximately perpendicular limbs 60f and 60g whichextend down opposite sides of the torque member and have turned-in ends engaging in holes 62 in the torque member. The limb 60a slidably engages the caliper and the two limbs 60a and 60c engage a projection 64 extending from the torque member. The two limbs 60f and 60g which flex and the limbs 60b and 60c which act as torsion arms are long in comparison with the distance between the points of contact of the limb 60a with the caliper and of the limbs 60b and 60c with the torque member so that the spring 60 is low spring rate and there is little variation in spring rate arising from manufacturing tolerances. As the turned-in ends of the limbs 60f and 60g are directed inwardly, it is possible to fit the spring 60 from the exterior of the torque member rather than, for example, form within the disc space so that the spring 60 can be fitted even when the brake is assembled onto a vehicle.

A lug 66 extends from the caliper and carries the sliding surface by which the caliper slidably engages a complementary surface of the torque member. The lug 66 is normally spaced by the action of the spring 60 from the torque member projection 64, but is engageable with the projection 64 to limit outward pivoting of the caliper about the pin 30 in the event of fracture of the spring 60.

In each of the described embodiments, the caliper may be displaced from the torque member to permit pad replacement by removing the bolt 34 from the pin 30 and withdrawing the caliper in a direction generally parallel to the axis of the disc rotation, having uncoupled the spring 44 in the embodiment of FIGS. 1 to 3. Alternatively, depending upon the environment in which the brake is installed, the caliper may be pivoted about the lug 50 or 66 and projection 46 or 64 following removal of the bolt 34 from the pin 30. In the embodiment of FIGS. 1 to 3, the projection 46 may be made removable from the torque member so that the caliper may be pivoted about the pin 30 following removal of the projection 46.

I claim:

1. A disc brake comprising a fixed torque member and a caliper member for straddling a minor portion of the periphery of a rotatable disc and applying friction elements to opposite sides of the disc, one of said members being slideably and pivotably connected to the other of said members by only a single pin extending parallel to the axis of disc rotation, a tension spring circumferentially spaced from said pin and slideably engaging said torque member, said spring extending to a connection point on the caliper member to bias the caliper member about said pin and into engagement with the torque member, a projection carried by the torque member, and a lug carried by the caliper member separately from said connection point and normally closely spaced from but directly engageable with said projection in the event of pivoting of the caliper member about the pin against the biasing of the spring, said caliper lug being positioned to be also engageable with the spring so as to cause sliding thereof relative to the torque member upon sliding of the caliper member on the torque member greater than a predetermined amount.

2. A disc comprising a fixed torque member and a caliper member for straddling a minor portion of periphery of a rotatable disc and applying friction elements to opposite sides of the disc, one of said members being slideably and pivotally connected to the other of said members by only a single pin extending parallel to the axis of disc rotation, a projection extending from the torque member parallel to the axis of disc rotation, a coil spring circumferentially spaced from said pin and extending between the caliper member and the projection to bias the caliper member about said pin and into engagement with the torque member, said coil spring being slideably located on said projection, a lug carried by the caliper member normally spaced from but engageable with said projection in the event of pivoting of the caliper member about the pin against the biasing of said coil spring, said coil spring being engaged by and displaced along said projection by said lug upon sliding of the caliper member on the torque member greater than the predetermined amount due to wear of said friction elements.

* * * * *